UNITED STATES PATENT OFFICE.

ADOLF ISRAEL AND KARL PATHE, OF ELBERFELD, GERMANY, ASSIGNORS TO THE FARBENFABRIKEN, VORMALS FR. BAYER & CO., OF SAME PLACE.

GRAY DYE.

SPECIFICATION forming part of Letters Patent No. 515,339, dated February 27, 1894.

Application filed November 11, 1893. Serial No. 490,687. (Specimens.) Patented in Germany December 20, 1891, No. 69,265; in France April 28, 1892, No. 221,233; in England June 20, 1892, No. 11,533; in Italy June 30, 1892, XXVI, 32,191, LXIII, 186, and in Austria-Hungary December 28, 1892, No. 4,046 and No. 3,873.

*To all whom it may concern:*

Be it known that we, ADOLF ISRAEL and KARL PATHE, doctors of philosophy and chemists, (assignors to the FARBENFABRIKEN, VORMALS FR. BAYER & CO., of Elberfeld,) subjects of the Emperor of Germany, residing at Elberfeld, Prussia, Germany, have invented a new and useful Improvement in the Manufacture of Gray Dye-Stuff, (for which the aforesaid FARBENFABRIKEN has already obtained Letters Patent in Germany, No. 69,265, dated December 20, 1891; in England, No. 11,533, dated June 20, 1892; in Austria-Hungary, Tom. 42, No. 4,046, and Tom. 26, No. 3,873, dated December 28, 1892; in France, No. 221,233, dated April 28, 1892, and in Italy, Vol. XXVI, No. 32,191, and Vol. LXIII, No. 186, dated June 30, 1892;) and we do hereby declare the following to be an exact and full description thereof.

Our invention relates to the production of a new substantive dye-stuff resulting from combining one molecular proportion of diazotized dehydrothiotoluidin sulfo acid with one molecular proportion of alpha naphthylamin, further diazotizing the so-called intermediate product and combining the diazo compound thus obtained with one molecular proportion of dihydroxynaphthalene monosulfonate of sodium in an acetic acid solution.

In carrying out our invention practically we proceed as follows: 34.2 parts, by weight, of dehydrothiotoluidin sulfonate of sodium are dissolved in three hundred parts, by weight, of hot water. The resulting solution is then cooled down by means of ice to about 35° centigrade. A solution of seven parts, by weight, of sodium nitrite in twenty parts, by weight, of cold water is added to the above solution of dehydrothiotoluidin sulfonic sodium in water. On adding thirty-six parts, by weight, of hydrochloric acid (20° Baumé) to the aforesaid liquid mixture and carefully stirring, the diazo compound of dehydrothiotoluidin sulfo acid is prepared. If the diazotization is complete, a solution prepared by dissolving 17.2 parts, by weight, of alpha naphthylamin in one hundred and sixty parts, by weight, of water with the addition of 14.5 parts, by weight, of hydrochloric acid (20° Baumé) is heated at about 40° centigrade and directly stirred into the diazo-compound mixture. The reaction is facilitated by continuous and energetic stirring during about from three to five hours. After this time diluted soda-lye is added, until the original darkish-brown color of the reaction-mixture has changed into orange. If this stage be arrived at, stirring is continued at ordinary temperature for about from three to five hours. After this time the formed intermediate product is filtered off, pressed and then thoroughly mixed in a fine condition with fifty parts, by weight, of water and ten parts, by weight, of sodium nitrite dissolved in about twenty-five parts, by weight, of water. At a temperature from 12° to 15° centigrade fifty-five parts, by weight, of hydrochloric acid (20° Baumé) are then gradually stirred into the above mixture. In this manner the diazocompound of the above intermediate product is formed which process is facilitated by continuous stirring for about from twelve to fifteen hours. The almost insoluble diazocompound of the intermediate product is then filtered off; the resulting precipitate is well mixed with a small quantity of water and stirred into four hundred parts, by weight, of water containing 26.3 parts, by weight, of the sodium salt of dihydroxynaphthalene monosulfo acid S, thirty parts, by weight, of sodium acetate and eighteen parts, by weight, of diluted acetic acid (containing thirty per cent. of pure acetic acid). The thus obtained mixture is allowed to stand for from twelve to fifteen hours. At the end of which time with continuous stirring the formation of the dye-stuff is complete. The mixture is then heated to about 60° centigrade and rendered alkaline by means of sodium carbonate. The dye-stuff which separates partially at ordinary temperature is completely separated by means of common salt. It is then filtered off, pressed and dried. It forms a gray powder, soluble in cold water with difficulty, easily soluble in hot water with a grayish-black color. On the addition of mineral acids to its hot watery solution, an almost insoluble precipitate is obtained. When dissolved in concentrated sulfuric acid (66° Baumé) the coloring-matter yields a grayish-green solution, reddish-gray flakes being precipitated on the addition of water to this sulfuric acid solution. It produces on unmordanted cotton from bluish-gray to grayish-black shades fast against the action of alkali and acid. A similar or analogous result is obtained, if, instead of dehydrothiotoluidin sulfo acid, the homologous dehydrothioxylidin sulfo acid or dehydrothiocumidin sulfo acid or other similar thio compounds are employed in the above process.

The above dye-stuffs correspond with the general formula:

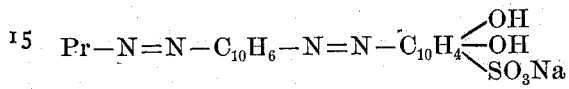

(in which formula Pr signifies the residue of the above defined thio compounds belonging to the so called primulin series.)

Having now described our invention and in what manner the same is to be performed, what we claim as new, and desire to secure by Letters Patent, is—

1. The process for the production of gray dye-stuff which consists in combining one molecular proportion of diazotized dehydrothiotoluidin sulfo acid with one molecular proportion of alpha naphthylamin, further diazotizing the resulting intermediate product and coupling the diazo product with one molecular proportion of dihydroxynaphthalene monosulfo acid S or a salt thereof, substantially as hereinbefore described.

2. As a new article of manufacture the new dye-stuff herein described being a gray powder soluble in cold water with difficulty, easily soluble in hot water with a grayish-black color, black flakes being precipitated on mixing its hot watery solution with mineral acids, soluble in concentrated sulfuric acid with a grayish-green color, a reddish-gray precipitate being separated on the addition of water to the above sulfuric acid solution, producing on unmordanted cotton from bluish-gray to grayish-black shades, the latter being fast against the action of alkali and acid.

In testimony whereof we have signed our names in the presence of two subscribing witnesses.

ADOLF ISRAEL.
KARL PATHE.

Witnesses:
WILLIAM ESSENWEIN,
F. H. STRAUSS.